United States Patent [19]

Phillips

[11] Patent Number: 5,355,423
[45] Date of Patent: Oct. 11, 1994

[54] OPTICAL TEMPERATURE PROBE ASSEMBLY

[75] Inventor: Richard W. Phillips, Eagan, Minn.

[73] Assignee: Rosemount Inc., Eden Prairie, Minn.

[21] Appl. No.: 914,796

[22] Filed: Jul. 16, 1992

[51] Int. Cl.$^5$ ............................................. G01D 5/26
[52] U.S. Cl. ........................................ 385/12; 385/31;
385/51; 385/78; 385/84; 374/131
[58] Field of Search .................. 385/12, 13, 31, 51,
385/78, 84; 356/43, 44; 374/131

[56] References Cited

U.S. PATENT DOCUMENTS

| | | | |
|---|---|---|---|
| Re. 31,832 | 2/1985 | Samulski | 374/131 |
| 4,367,040 | 1/1983 | Goto | 356/44 |
| 4,560,286 | 12/1985 | Wickersheim | 374/131 |
| 4,592,664 | 6/1986 | Bijlenga et al. | 374/131 |
| 4,598,996 | 7/1986 | Taniuchi | 356/43 |
| 4,626,110 | 12/1986 | Wickersheim et al. | 374/131 |
| 4,652,143 | 3/1987 | Wickersheim et al. | 374/161 |
| 4,689,483 | 8/1987 | Weinberger | 250/231 R |
| 4,752,141 | 6/1988 | Sun et al. | 374/161 |
| 4,776,827 | 10/1988 | Greaves | 374/161 |
| 4,794,619 | 12/1988 | Tregay | 374/131 |
| 4,883,354 | 11/1989 | Sun et al. | 356/128 |
| 4,906,106 | 3/1990 | Kaufmann et al. | 374/131 |
| 4,988,212 | 1/1991 | Sun et al. | 374/161 |
| 4,997,286 | 3/1991 | Fehrenbach et al. | 374/131 |
| 5,032,026 | 7/1991 | Jouve et al. | 356/351 |
| 5,048,168 | 9/1991 | Vanaschen et al. | 29/118 |
| 5,211,480 | 5/1993 | Thomas et al. | 374/161 |

FOREIGN PATENT DOCUMENTS

| | | |
|---|---|---|
| 0259027 | 8/1987 | European Pat. Off. . |
| 0392897 | 10/1990 | European Pat. Off. . |
| WO92/07240 | 4/1992 | PCT Int'l Appl. . |
| 2113837B | 4/1986 | United Kingdom . |

OTHER PUBLICATIONS

"Development of a High-Temperature Fiber-Optic Thermometer Probe Using Fluorescent Decay," by K. T. V. Grattan, A. W. Palmer, and Z. Zhang, May 1991.
"Optical fibre Sensing Techniques for Wide Range Temperature Measurement," by K. T. V. Grattan, A. W. Palmer and F. A. S. Al-Ramadahan, presented at Conference TEMPMEKO '90, Helsinki, Finland, Sep. 1990 in Industry and Sciences, 17–19 Sep. 1990 Helsinki, Finland by Finnish Society of Automatic Control ISBN 951-96042-2-7, pp. 182–190, 1990.
SPIE–The International Society for Optical Engineering, Fiber Optic Systems for Mobile Platforms IV, Sep. 18, 1990, San Jose Calif., vol. 1369, pp.87–95.
R. W. Phillips and S. D. Tilstra, Design of a Fiber Optic Temperature Sensor for Aerospace Applications, Rosemount Inc., 1992 (month not available).

*Primary Examiner*—Frank Gonzalez
*Attorney, Agent, or Firm*—Westman, Champlin & Kelly

[57] ABSTRACT

A temperature probe includes a sensor material optically communicating with a waveguide, and a sheath having a sheath coefficient of thermal expansion substantially matched to a thermal expansion coefficient of the waveguide. The waveguide has first and second ends secured proximate corresponding sheath ends. In another aspect of the invention, waveguide ends are secured near the sheath ends, the sheath is bent at one or more locations so that it is noncylindrical, and a midsection of the waveguide is loosely held within the bent sheath. In still another aspect of the invention, a metallic tube with the sensor material disposed therein is secured to the waveguide by direct attachment to a metallic coating on the waveguide.

32 Claims, 2 Drawing Sheets

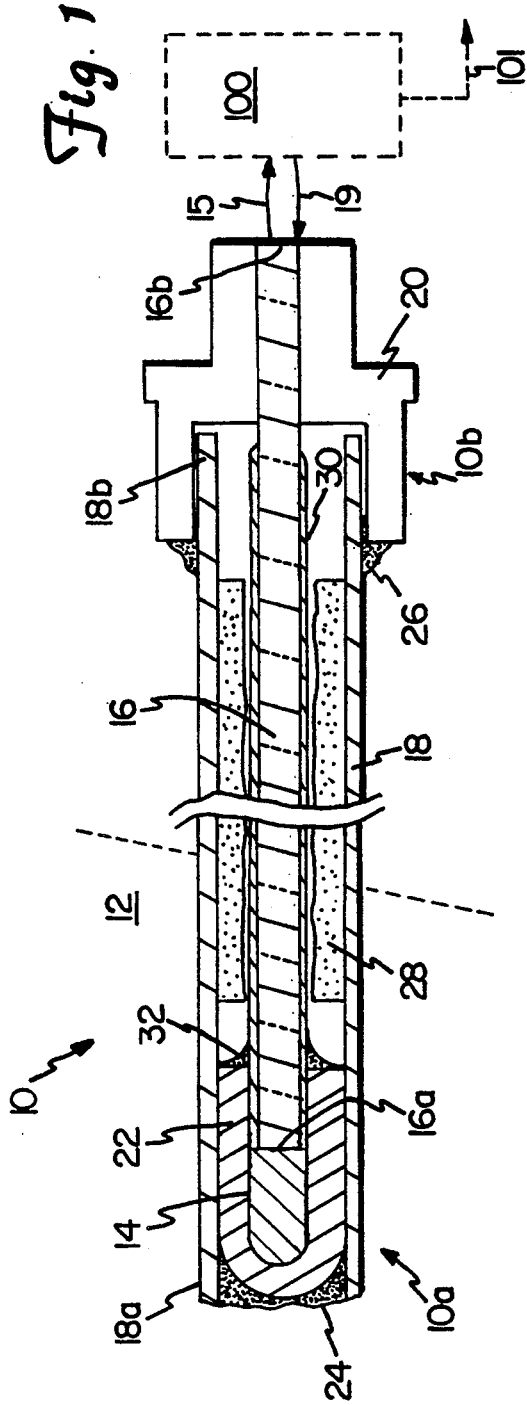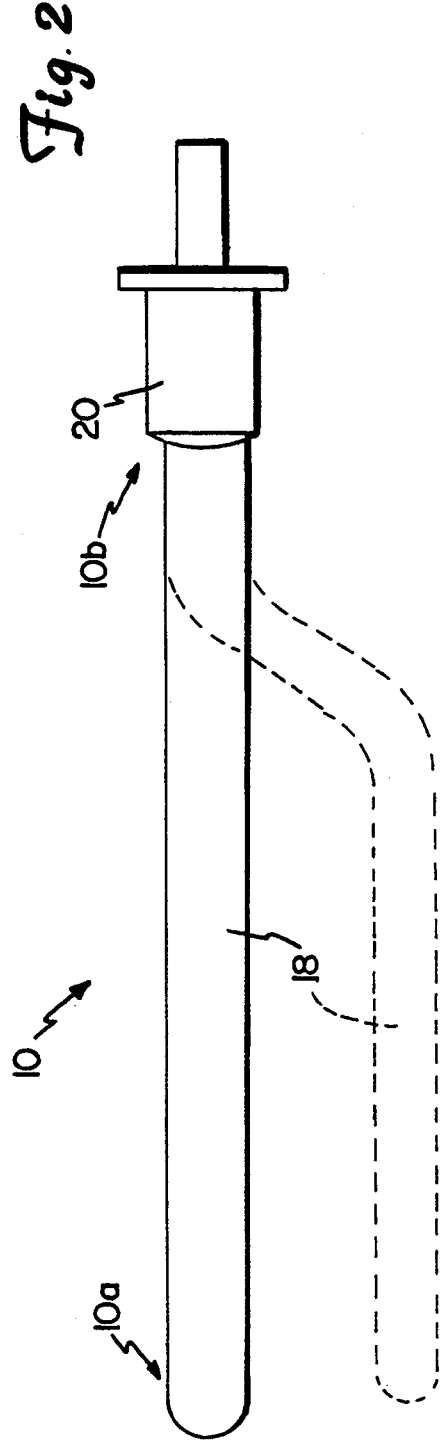

OPTICAL TEMPERATURE PROBE ASSEMBLY

BACKGROUND OF THE INVENTION

This invention relates to temperature probes for measuring temperature, and in particular to those probes employing optical methods of measuring temperature.

BRIEF SUMMARY OF THE INVENTION

In one aspect of the present invention, a temperature probe comprises a quantity of sensor material in optical communication with a waveguide, and a sheath having a sheath coefficient of thermal expansion substantially matched to a thermal expansion coefficient of the waveguide. The waveguide has first and second ends secured proximate first and second sheath ends, respectively. The temperature probe is operable with means for detecting a thermally responsive characteristic of the sensor material and for providing an output indicative of the characteristic, thereby being indicative of a temperature at the sensor material. Preferably, the waveguide comprises silica and the sheath comprises a low expansion metal alloy such as Invar.

In another aspect of the invention the temperature probe includes a metallic tube, with the sensor material disposed therein, held to the waveguide by attachment to a metallic coating on an outside surface of the waveguide. Preferably, attachment is by a braze joint.

In still another aspect of the invention, the temperature probe comprises a noncylindrical, or bent, sheath. First and second waveguide ends of a waveguide are secured proximate first and second sheath ends, respectively, and a waveguide midsection is held loosely within the sheath.

BRIEF DESCRIPTION OF THE DRAWINGS

FIG. 1 is a cross-sectional view of a temperature probe in accordance with the invention;

FIG. 2 is an elevational view of the temperature probe of FIG. 1;

DETAILED DESCRIPTION OF THE PREFERRED EMBODIMENTS

Figure 3:
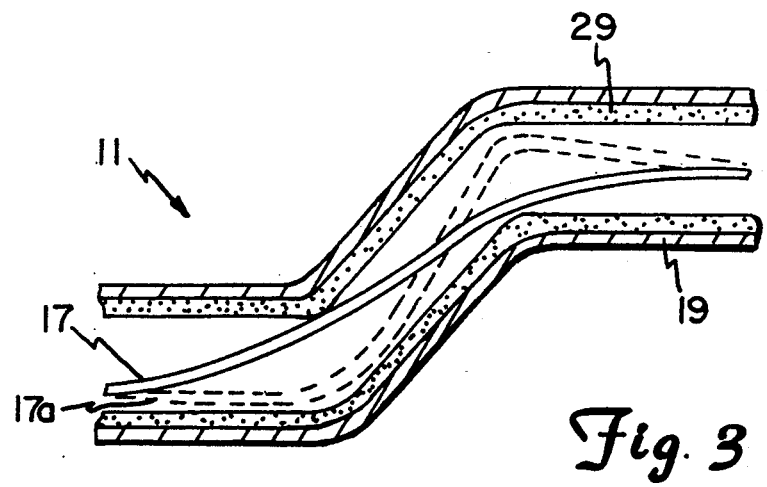
FIG. 3 is a cross-sectional view of a midportion of the temperature probe of FIG. 2.

In FIG. 1, temperature probe 10 has probe ends 10a,10b and measures a temperature of a region generally indicated at 12, proximate probe end 10a. Sensor material 14 thermally communicates with region 12, and has a detectable characteristic which changes as a function of a temperature of material 14, which material temperature is closely related to the temperature of region 12. Preferably, material 14 comprises luminescent material having a luminescent lifetime or time rate of decay responsive to the temperature of the material. U.S. patent application Ser. No. 599,814, filed Oct. 18, 1990, now U.S. Pat. No. 5,211,480 issued May 18, 1993, and incorporated herein by reference, teaches examples of such luminescent materials. Luminescent materials are preferred because they are generally compatable with single fiber bidirectional operation, and because only small amounts of the material are normally required, reducing sensor material mass and volume, thereby permitting construction of a small, slender probe and enhancing thermal time response.

Sensor material 14 communicates with control means 100 via optical fiber or waveguide 16, having waveguide ends 16a,16b. A connector pin 20 preferably secures waveguide end 16b proximate one end of a sheath 18. Sheath 18 protects waveguide 16 along substantially the entire length of the waveguide. Sheath 18 is preferably a rigid, metallic tube, so that probe 10 is easily handled or manipulated by a user without excessively stressing or breaking waveguide 16. However, sheath 18 is also preferably of appropriate thickness, diameter, length, and composition so that it is malleable, i.e., so that an operator or machine can readily bend the sheath into a noncylindrical shape (see broken line portion of FIG. 2) which shape the sheath then retains. Whether sheath 18 is cylindrical or noncylindrical, it can have any desired cross-sectional shape, circular or non-circular, in a plane perpendicular to its length. The ability of the sheath to be bent and to retain noncylindrical shapes is advantageous because the probe can be built using standard cylindrical sheathing material and can then be used in applications in which, due to mounting requirements, connector pin 20 and sheath end 10a are noncollinear.

According to the invention, sheath 16 is composed of a material having an expansion coefficient substantially matched to the expansion coefficient of waveguide 16 over at least a portion of the measurement temperature range. Silica waveguides (i.e., those having a light-guiding core region composed predominantly of silica, commonly referred to as fused silica or quartz) are preferred for use as waveguide 16 because of their ability to withstand high temperatures without melting or softening. Silica waveguides also advantageously have low optical attenuation and are inexpensive. Alternately, waveguide 16 can comprise other transparent materials such as glass, sapphire, or the like. Probes having silica waveguides have been subjected to repeated thermal cycling, and enhanced long-term stability of measured luminescent signal levels has been observed for such probes having a sheath of a low expansion metal alloy rather than of a more common metal such as 304 stainless steel. One such low expansion metal alloy is Invar, available from Carpenter Technology Corp., Reading Pennsylvania, and comprises approximately 63% iron, 36% nickel, and 1% other elements. Table 1 shows approximate values of thermal expansion coefficient (in the vicinity of room temperature) and values relative to that of silica for various materials.

TABLE 1

| | 304 stainless steel | silica | Invar | platinum | aluminum |
|---|---|---|---|---|---|
| Expansion Coefficient (in units of $10^{-6}/°C.$) | 17.2 | 0.5 | 1.2 | 8.9 | 22.5 |
| Expansion Coefficient Relative to silica | 34.4 | 1.0 | 2.4 | 17.8 | 45.0 |

In many temperature sensing applications, such as measurements within the resonant cavities of microwave ovens, electrically conductive materials such as metals are highly undesirable because of their interaction with microwave fields within the environment, and they are thus eliminated from the optical temperature probe. But in some applications metals and similar materials can be used to advantage. Temperature probe 10 preferably includes metallic tube 22 holding sensor material 14 in optical communication with waveguide end 16a. Braze material 24 bonds tube 22 to sheath 18. With this construction, sensor material 14 has enhanced thermal coupling to region 12 because of its close proximity to sheath end 18a and because of the high thermal conductivity and low thickness of the material (metallic tube 22 along with either braze material 24 or sheath 18) between sensor material 14 and region 12. Table 2 contains preferred dimensional characteristics of a temperature probe in accordance with the invention. In an alternate embodiment, at least a portion of tube 22 can extend beyond sheath end 18a and braze material 24 to further enhance thermal coupling of sensor material 14 to region 12. Although brazing is preferred, welding or soldering can also be used to bond metallic tube 22 to sheath 18.

In FIG. 3, a midsection of a temperature probe 11 includes a noncylindrical sheath 19, a buffer layer 29, and a waveguide midsection along path 17. Waveguide ends, not shown, are secured proximate the sheath ends. If sheath 19 has a sheath coefficient of thermal expansion which is not matched to a thermal expansion coefficient of the waveguide (e.g., where the sheath is made of aluminum and the waveguide is made of silica), or if the sheath coefficient is substantially matched to the waveguide coefficient but there is a residual mismatch over at least a portion of the measurement temperature range, then stresses can develop in the waveguide when the waveguide ends are secured to the sheath. In such case buffer layer 29 advantageously holds the waveguide midsection relatively loosely within the sheath, permitting limited transverse motion of those portions, to relieve such stresses on the waveguide. For example, if the sheath comprises 304 stainless steel and the waveguide comprises silica, the sheath will expand more with increasing temperature than the waveguide, tend-

TABLE 2

| Waveguide Light-Guiding Core Diameter | Sheath | | | Tube | | |
|---|---|---|---|---|---|---|
| | Length | Inside Diameter | Wall Thickness | Length | Inside Diameter | Wall Thickness |
| ~200 µm | ≧25 mm | .5–2.5 mm | .1–1 mm | 1–5 mm | .2–.5 mm | .1–1 mm |

Attachment of sheath 18 to tube 22, and connection of tube 22 to waveguide 16, secures waveguide end 16a proximate sheath end 18a. Another waveguide end 16b is disposed and preferably secured proximate sheath end 18b by attachment to connector pin 20, which in turn attaches to sheath 18 by epoxy 26 or other suitable means. Sheath 18 preferably has a length sufficient to ensure that connector pin 20 experiences only moderate temperature extremes when end 18a is exposed to the measurement temperature range of region 12.

Control means 100 includes means for detecting light 15 from sensor material 14 and can also include one or more waveguide links and means for injecting interrogation or excitation light 19 along waveguide 16 to sensor material 14. Connector pin 20 mates with a corresponding part of means 100 to effect communication between control means 100 and sensor material 14. Control means 100 provides output 101 indicative of the thermally responsive characteristic of sensor material 14, thereby being indicative of region 12 temperature.

Vibration of probe 10 can cause rapid relative motion of intermediate portions of waveguide 16 within sheath 18, leading to possible fatigue and eventual fracture of the waveguide. Probe 10 preferably includes a buffer layer 28 to reduce such rapid motion of waveguide 16. For several reasons, buffer layer 28 preferably comprises a ceramic or silica-based insulation in the form of a powder or a fibrous braided sleeving. First, such insulation functions as a cushion for waveguide 16 because it is relatively soft and compressible. Second, such insulation conforms to noncylindrical shapes of sheath 18, permitting bending of probe 10 after installation of the insulation within sheath 18. Third, such insulation has relatively low thermal conductivity and high porosity, reducing thermal coupling of waveguide 16 to sheath 18. This helps protect waveguide 16 from extreme temperatures such as during brazing or welding of sheath 18 to other parts. It also helps reduce measurement errors by reducing heat conduction along the probe length.

ing to stretch the waveguide so that it occupies path 17. For decreasing temperature the sheath will contract more than the waveguide, tending to compress the waveguide. But the loosely held waveguide midsection can then shift to path 17a, to again relieve stress on the waveguide. In a preferred embodiment, buffer layer 29 comprises a relatively soft and compressable insulation such as braided silica sleeving, discussed above. Such insulation can substantially fill the space between the waveguide midsection and sheath 19, but still hold the waveguide relatively loosely because the insulation elastically deforms to accomodate small motions of the waveguide.

U.S. patent application Ser. No. 599,814, now U.S. Pat. No. 5,211,480 mentioned above, teaches holding the sensor material in a silica tube which is bonded to an optical fiber by a glass bond; such an arrangement can be used with the invention. However, the relatively brittle silica tube and glass bond are susceptible to fracture after repeated exposure to temperature changes and vibration. Turning again to FIG. 1, the present invention encompasses an improved temperature probe subassembly including waveguide 16 and metallic tube 22. A metallic coating 30 covers at least a portion of waveguide 16. Metallic coating 30 can be a layer of a single material, or a compound layer of multiple materials (e.g., a nickel layer overcoating a gold layer). According to the invention, metallic tube 22 is secured to waveguide end 16a by direct attachment to metallic coating 30. Preferably, the attachment is a braze joint comprising braze material 32. Metallic tube 22 can also be welded to metallic coating 30, but this technique is not preferred because it subjects the waveguide to much higher temperatures and because it requires a thicker metallic coating than is common for optical fibers. The thicker metallic coating reduces flexibility of the waveguide and increases cost. Soldering can also be used within the scope of the invention. Metallic tube 22 has a thermal expansion coefficient substantially matched to that of waveguide 16. Thus, for a probe having a silica waveguide, the metallic tube is preferably composed of a low expansion alloy such as Invar, or a precious metal such as platinum or an alloy of platinum such as platinum-rhodium. Platinum or platinum-rhodium can likewise be used for the sheath, but the high cost of platinum and relatively large amount of material required for sheath 18 make that alternative rather expensive.

The use of the more ductile materials of the metallic tube and braze joint in place of the more brittle silica tube and glass bond are believed to enhance reliability of the temperature probe and reduce the chance of fracture from thermal cycling and vibration.

Figure 4:
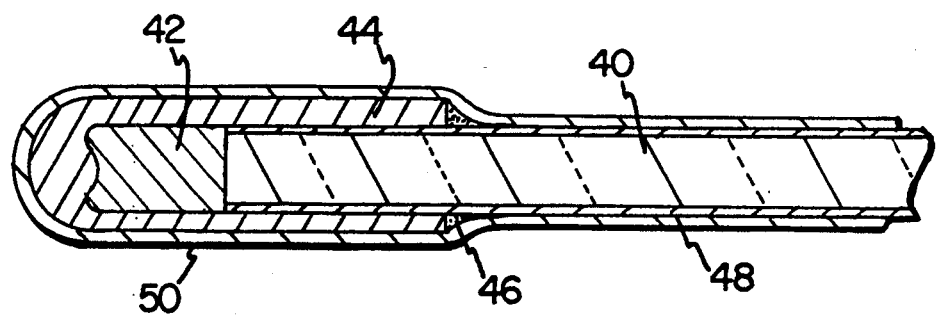
FIG. 4 is a cross-sectional view of a temperature probe subassembly in accordance with the invention.

FIG. 4 shows another embodiment of a temperature probe in accordance with the invention. In that figure, waveguide 40 abuts sensor material 42, which is sandwiched between waveguide 40 and tube 44. Tube 44 is preferably a metallic tube, and braze material 46 preferably bonds the tube to metallic coating 48 which covers at least a portion of waveguide 40. The waveguide includes a light-guiding core region (preferably composed predominantly of silica) and also preferably a cladding region, which can also be composed predominantly of silica. As discussed in connection with FIG. 1, tube 44 preferably has a thermal expansion coefficient substantially matched to that of waveguide 40. In FIG. 4, plating 50 covers the temperature probe, thereby strengthening the device from fractures due to, e.g., thermal or mechanical stress. If the coating 48, tube 44, and bonding material 46 are conductive, then plating 50 can be conveniently applied by electrodeposition. Plating 50 is preferably nickel, which not only strengthens the temperature probe but also resists corrosion. The plating is preferably sufficiently thin, less than 50 μm in the case of nickel, to permit bending of waveguide 40.

Figure 5:
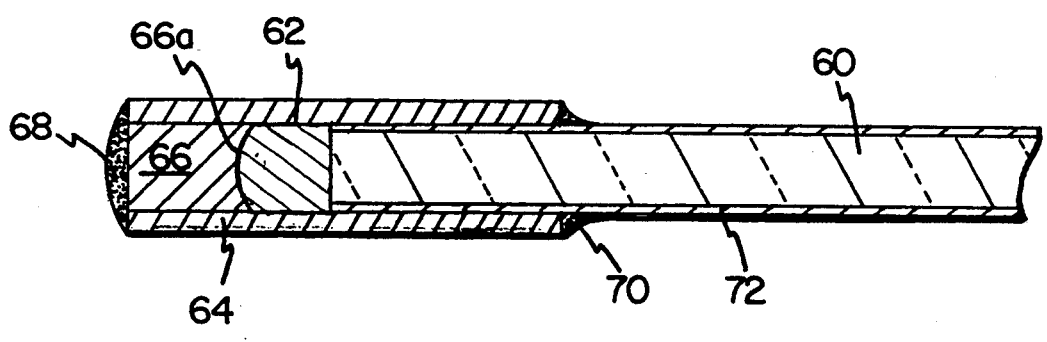
FIG. 5 is a cross-sectional view of another embodiment of a temperature probe subassembly in accordance with the invention.

FIG. 5 shows yet another embodiment of a temperature probe similar to that of FIG. 4. Waveguide 60 abuts sensor material 62 which is disposed in tube 64. Plug 66 inserts into one end of tube 64, substantially sealing the tube end to prevent escape of sensor material 62 from the tube end. Preferably, tube 64 and plug 66 are metallic and have thermal expansion coefficients substantially matched to that of waveguide 60, as discussed above. Braze material 68 preferably bonds plug 66 to tube 64, and braze material 70 preferably bonds tube 64 to waveguide 60 by attachment to metallic coating 72. Plug 66 advantageously has a reflective surface 66a to enhance levels of light collected by waveguide 60 or alternately to permit use of a reduced amount of sensor material 62, reducing the size and mass of the probe. Reflective surface 66a is preferably curved to enhance signal level, but can also be flat. The probe shown in FIG. 5 can be plated as in FIG. 4 with a material such as nickel to strengthen the probe and protect the probe from corrosion. The plating can also be advantageously applied to outer surfaces of tube 22, braze material 32, and coating 30 of FIG. 1, or to outer surfaces of tube 22, braze material 24, and sheath 18 of that figure.

Although the present invention has been described with reference to preferred embodiments, workers skilled in the art will recognize that changes can be made in form and detail without departing from the spirit and scope of the invention. Embodiments in which multiple waveguides communicate with respective multiple quantities of sensor material to provide redundant sensing elements, and embodiments in which multiple waveguides communicate with a single quantity of sensor material, are within the scope of the invention. The terms "light" and "optic(al)", when used herein, refer to not only visible light but electromagnetic radiation having wavelengths from about 100 nanometers to 100,000 nanometers.

What is claimed is:

1. A temperature probe, comprising:
    a sheath having a first and second sheath end, and further having a sheath coefficient of thermal expansion;
    a waveguide having a first waveguide end secured proximate the first sheath end and a second waveguide end secured proximate the second sheath end, the waveguide having a waveguide coefficient of thermal expansion; and
    a sensor material having a thermally responsive characteristic, and in optical communication with the second waveguide end;
    wherein the sheath coefficient is substantially matched to the waveguide coefficient.

2. The temperature probe as recited in claim 1, wherein the sheath coefficient is not greater than 25 times the waveguide coefficient.

3. The temperature probe as recited in claim 1, wherein a ratio of the sheath coefficient to the waveguide coefficient has a magnitude between 10 and 1/10.

4. The temperature probe as recited in claim 1, wherein a ratio of the sheath coefficient to the waveguide coefficient has a magnitude between 5 and 1/5.

5. The temperature probe as recited in any one of claims 1, 2, 3, or 4, wherein the waveguide includes a light-guiding core comprising silica, and wherein the waveguide coefficient is substantially equal to a thermal expansion coefficient of silica.

6. The temperature probe as recited in claim 5, wherein the sheath comprises a material selected from the group consisting of platinum, platinum-rhodium alloy, and iron-nickel alloy.

7. The temperature probe as recited in claim 1, wherein the sensor material comprises a luminescent material, and wherein the characteristic is a luminescent lifetime.

8. The temperature probe as recited in claim 1, further comprising:
    a mating member connecting the first waveguide end to the first sheath end, the mating member having a bore for receiving the first waveguide end.

9. The temperature probe as recited in claim 1, further comprising:
    a metallic tube held at the second waveguide end and containing the sensor material;
    wherein the metallic tube attaches to the sheath.

10. The temperature probe as recited in claim 9, wherein the metallic tube attaches to the sheath by a braze, weld, or solder joint.

11. The temperature probe as recited in claim 9, wherein the tube has a tube coefficient of thermal expansion which is substantially matched to the waveguide coefficient.

12. The temperature probe as recited in claim 1, wherein the sheath is adapted to malleably bend into a noncylindrical shape.

13. The temperature probe as recited in claim 12, further comprising:
    a buffer layer disposed between the waveguide and the sheath.

14. The temperature probe as recited in claim 13, wherein the buffer layer is porous.

15. The temperature probe as recited in claim 14, wherein the buffer layer includes braided fibrous sleeving.

16. A temperature probe, comprising:
a sensor material having a thermally responsive characteristic;
a waveguide having an outside surface and a waveguide end which is in optical communication with the sensor material;
a metallic coating covering at least a portion of the waveguide outside surface; and
a metallic tube attached to the metallic coating with the sensor material disposed therein, the metallic tube being held to the waveguide proximate the waveguide end;
wherein the waveguide has a waveguide coefficient of thermal expansion, the metallic tube has a tube coefficient of thermal expansion, and the tube coefficient is substantially matched to the waveguide coefficient.

17. The temperature probe as recited in claim 16, wherein the tube coefficient is not greater than 25 times the waveguide coefficient.

18. The temperature probe as recited in claim 16, wherein the ratio of the tube coefficient in the waveguide coefficient has a magnitude between 10 and 1/10.

19. The temperature probe as recited in claim 16, wherein a ratio of the tube coefficient to the waveguide coefficient has a magnitude between 5 and 1/5.

20. The temperature probe as recited in any one of claims 16, 17, 18, or 19, wherein the waveguide includes a light-guiding core comprising silica, and wherein the waveguide coefficient is substantially equal to a thermal expansion coefficient of silica.

21. The temperature probe as recited in claim 20, wherein the metallic tube comprises a material selected from the group consisting of platinum, platinum-rhodium alloy, and iron-nickel alloy.

22. The temperature probe as recited in claim 21, wherein the metallic coating comprises gold.

23. The temperature probe as recited in claim 21, wherein the metallic coating comprises nickel.

24. The temperature probe as recited in claim 16, further comprising:
a sheath in which the metallic coating, metallic tube, and waveguide are disposed, the sheath having a sheath coefficient of thermal expansion;
wherein the sheath coefficient is substantially matched to the waveguide coefficient.

25. The temperature probe as recited in claim 24, wherein the sheath is adapted to malleably bend into a noncylindrical shape.

26. A temperature probe, comprising:
a sheath having a first and second sheath end;
a waveguide having a first waveguide and secured proximate the first sheath end, a second waveguide end secured proximate the second sheath end, and waveguide midsection; and
a sensor material having the thermally responsive characteristic, and in optical communication with the second waveguide end;
wherein the sheath has a noncylindrical shape, and the waveguide midsection is loosely held within the sheath.

27. The temperature probe as recited in claim 26, further comprising:
a buffer layer disposed between the waveguide midsection and the sheath.

28. The temperature probe as recited in claim 27, wherein the buffer layer comprises braided silica sleeving.

29. A temperature probe, comprising:
a sensor material having a thermally responsive characteristic;
a waveguide having an outside surface and a waveguide end which is in optical communication with the sensor material;
a metallic coating covering at least a portion of the waveguide outside surface; and
a metallic tube attached to the metallic coating with the sensor material disposed therein, the metallic tube being held to the waveguide proximate the waveguide end;
wherein the sensor material is a luminescent powder tightly packed between the metallic tube and the waveguide, and wherein the characteristic is a lifetime of luminescence.

30. A temperature probe, comprising:
a sensor material having a thermally responsive characteristic;
a waveguide having an outside surface and a waveguide end which is in optical communication with the sensor material;
a metallic coating covering at least a portion of the waveguide outside surface;
a metallic tube attached to the metallic coating with the sensor material disposed therein, the metallic tube having a first open tube end held to the waveguide and a second open tube end; and
an end cap substantially sealing the second open tub end to prevent escape of the sensor material from the metallic tube, the end cap having a reflective surface adjacent the sensor material.

31. A temperature probe, comprising:
a sensor material having a thermally responsive characteristic;
a waveguide having an outside surface and a waveguide end which is in optical communication with the sensor material;
a metallic coating covering at least a portion of the waveguide outside surface;
a metallic tube attached to the metallic coating with the sensor material disposed therein, the metallic tube being held to the waveguide proximate the waveguide end; and
a metallic plating substantially covering the metallic coating and the metallic tube.

32. The temperature probe as recited in any one of claims 16, 29, 30 or 31, wherein the metallic tube is a unitary metallic tube.

* * * * *